United States Patent
Hou et al.

(10) Patent No.: US 8,232,768 B2
(45) Date of Patent: Jul. 31, 2012

(54) SYSTEM AND METHOD FOR BALANCING BATTERY CELLS

(75) Inventors: Xiaohua Hou, Shanghai (CN); Jiulian Dai, Shanghai (CN)

(73) Assignee: O2Micro, Inc., Santa Clara, CA (US)

( * ) Notice: Subject to any disclaimer, the term of this patent is extended or adjusted under 35 U.S.C. 154(b) by 318 days.

(21) Appl. No.: 12/321,723

(22) Filed: Jan. 23, 2009

(65) Prior Publication Data

US 2010/0190041 A1    Jul. 29, 2010

(51) Int. Cl.
*H02J 7/00* (2006.01)
(52) U.S. Cl. ......................................................... 320/121
(58) Field of Classification Search .................... 320/121
See application file for complete search history.

(56) References Cited

U.S. PATENT DOCUMENTS

| | | | |
|---|---|---|---|
| 5,504,415 A * | 4/1996 | Podrazhansky et al. | 320/118 |
| 2004/0160213 A1 * | 8/2004 | Stanesti et al. | 320/116 |
| 2004/0257042 A1 | 12/2004 | Liu et al. | |
| 2005/0194931 A1 * | 9/2005 | Sobue et al. | 320/116 |
| 2005/0242776 A1 * | 11/2005 | Emori et al. | 320/116 |
| 2007/0285054 A1 * | 12/2007 | Li et al. | 320/116 |
| 2008/0079395 A1 * | 4/2008 | Miyazaki et al. | 320/118 |

FOREIGN PATENT DOCUMENTS

| | | |
|---|---|---|
| CN | 1489236 A | 4/2004 |
| CN | 1574540 A | 2/2005 |
| WO | 2008097031 A1 | 8/2008 |

OTHER PUBLICATIONS

English translation for Abstract of CN1489236A.

* cited by examiner

*Primary Examiner* — Arun Williams

(57) ABSTRACT

A system for cell balancing comprises battery modules and a controller. Each of the battery modules comprises battery cells, balance circuits and a battery management module. The battery management module in each of the battery modules is coupled to the battery cells and for acquiring cell voltages of battery cells. The balance circuits are coupled to the battery cells and for performing balance operation on the battery cells under control of the battery management module. The controller is coupled to the battery modules and for generating a reference signal based on the cell voltages provided by each of the battery modules. The battery management module in each of the battery modules can control the balance circuits to balance the battery cells according to the reference signal, thereby achieving cell balance among the battery modules.

14 Claims, 4 Drawing Sheets

SYSTEM AND METHOD FOR BALANCING BATTERY CELLS

BACKGROUND

Cell balancing can be used for battery packs including multiple cells. If the battery cells are not balanced, the battery packs may have less available capacity, since the capacity of the weakest cell in the serially connected cells can determine the overall pack capacity. Unbalancing can occur when a difference in cell voltages is greater than a certain level. In battery systems, battery cell information can be measured by a circuit on-chip or a printed circuit board (PCB). A battery management board can balance cells according to the measured battery cell information. In relatively large battery management systems which include many battery modules, battery cell balancing can be implemented in each battery module.

FIG. 1 illustrates a block diagram showing a conventional system 100 for balancing battery cells. The system 100 includes battery modules 182 and 184 having similar structures. The battery module 182 includes battery cells 102 and 104, cell balancing circuits 122 and 124, cell voltage sampling circuits 132, 134, 136 and 138, a module balancing circuit 112, and a battery management module 162. The battery module 184 includes battery cells 106 and 108, cell balancing circuits 126 and 128, cell voltage sampling circuits 142, 144, 146 and 148, a module balancing circuit 114, and a battery management module 166.

The cell voltage sampling circuits 132, 134, 136 and 138 monitor voltages across the battery cells 102 and 104. The battery management module 162 acquires the sampled voltages from the cell voltage sampling circuits 132, 134, 136 and 138, selects a reference cell voltage (e.g., a minimum voltage) from the sampled voltages, and compares the reference cell voltage with the sampled cell voltages respectively. If a difference between the reference cell voltage and the cell voltage of a battery cell, e.g., the battery cell 102 or 104, is greater than a predetermined threshold, the battery management module 162 can control the cell balancing circuits to bypass a current of the battery cell. As such, voltages of the battery cells 102 and 104 can be balanced within the battery module 182 according to the reference cell voltage. The voltages of the battery cells 106 and 108 can be balanced in a similar manner.

In the system 100, the battery modules 182 and 184 perform cell balancing within each individual module. If the unbalance occurs between the battery modules 182 and 184, the module balance circuits 112 and 114 are used for bypassing the current of the entire battery module. However, the efficiency of the battery system can be reduced. Moreover, since the current flowing through the entire battery module is bypassed for cell balancing, power consumption can be increased.

SUMMARY

In one embodiment, the system for cell balancing comprises battery modules and a controller. The battery module comprises battery cells, balance circuits and a battery management module. The battery management module in each of the battery modules is coupled to the battery cells and for acquiring cell voltages of battery cells. The balance circuits are coupled to the battery cells and for performing balance operation on the battery cells under control of the battery management module. The controller is coupled to the battery modules and for generating a reference signal based on the cell voltages provided by each of the battery modules. The battery management module in each of the battery modules can control the balance circuits to balance the battery cells according to the reference signal, thereby achieving cell balance among the battery modules.

BRIEF DESCRIPTION OF THE DRAWINGS

Other objects, advantages, and novel features of the invention will become more apparent from the following detailed description when taken in conjunction with the accompanying drawing.

DETAILED DESCRIPTION

Reference will now be made in detail to the embodiments of the present invention, system and method for cell balancing. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Figure 1:
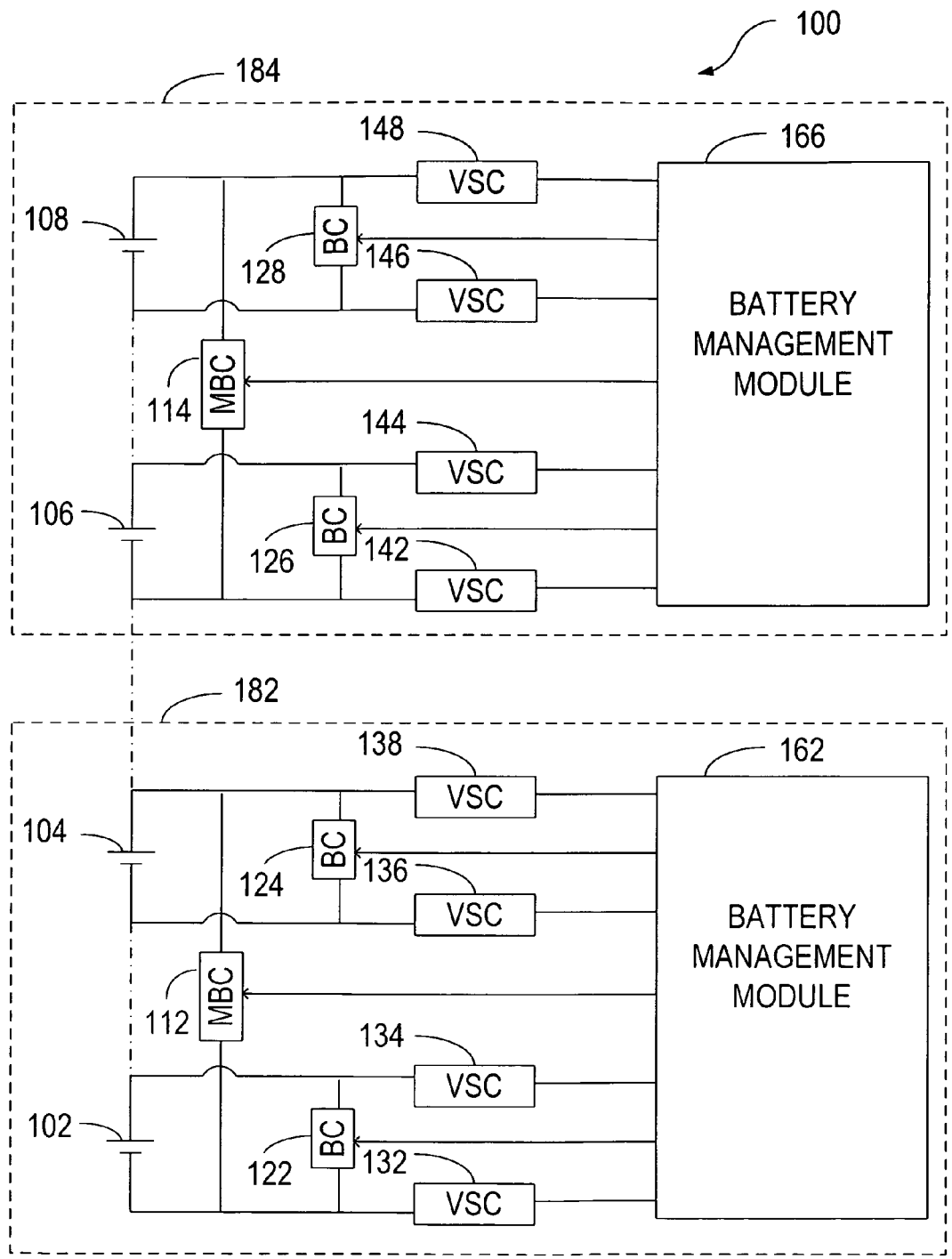
FIG. 1 is a diagram showing a conventional system for balancing battery cells.
Figure 2:
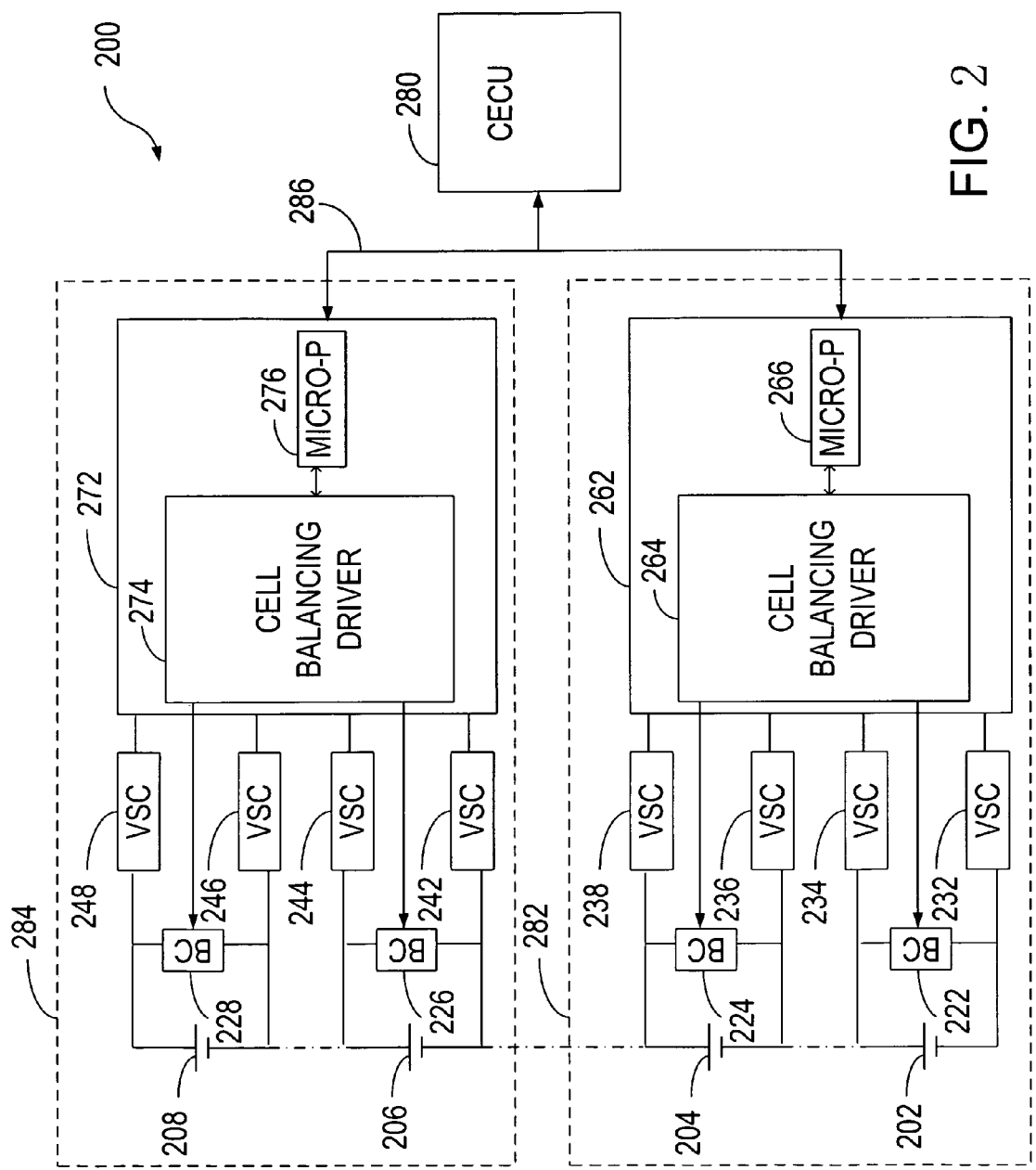
FIG. 2 is a diagram showing a system for balancing battery cells, in accordance with one embodiment of the present invention.

FIG. 2 shows a block diagram of a system 200 for balancing battery cells, in accordance with one embodiment of the present invention. In the example of FIG. 2, the system 200 includes battery modules 282 and 284, and a controller, e.g., a central electric control unit (CECU) 280. The system 200 can include any number of battery modules according to different application requirements.

In one embodiment, the battery module 282 includes battery cells 202 and 204, cell balancing circuits 222 and 224, cell voltage sampling circuits 232, 234, 236 and 238, and a battery management module 262. In one embodiment, the battery module 284 includes battery cells 206 and 208, cell balancing circuits 226 and 228, cell voltage sampling circuits 242, 244, 246 and 248, and a battery management module 272. The battery modules 282 and 284 can include any number of battery cells according to different application requirements. The structure of the battery module 282 is similar to that of the battery module 284.

In one embodiment, the battery management module 262 is coupled to the battery cells 202 and 204, and includes a cell balancing driver 264 and a micro-processor 266. The battery management module 262 can be a protection and monitor integrated circuit (IC) for managing a battery pack, such as lithium ion (Li-Ion) or nickel metal hydride (NiMH) battery pack. Using a cyclic scan and time slot method, the battery management module 262 can monitor cell voltages of the battery cells 202 and 204 through the cell voltage sampling circuits 232, 234, 236 and 238. The battery management module 262 can periodically measure the voltages of the battery cells 202 and 204 at a predefined scan rate. During a measurement period, the cell voltages can be measured one by one sequentially. In one embodiment, besides measuring the cell voltages of the battery cells 202 and 204, the battery management module 262 can constantly monitor the charging/discharging current and the pack/cell temperature to provide protection functions including but is not limited to, over-voltage, under-voltage, over-current, short-circuit, over-temperature and under-temperature safety protection.

By monitoring the cell voltages of the battery cells 202 and 204, the battery management module 262 can obtain information of the cell voltages. Similarly, the battery management module 272 can obtain information of the cell voltages of the battery cell 206 and 208. In one embodiment, the cell voltages of the battery cell 202, 204, 206 and 208 can be sent to the CECU 280 through a communication bus 286. The communication bus 286 can transmit various signals, such as voltage signals and control signals. The CECU 280 compares the received cell voltages to generate a reference signal. In one embodiment, the reference signal can indicate the minimum cell voltage Vmin of the battery cell 202, 204, 206 and 208. The reference signal indicative of the minimum cell voltage Vmin can be fed back to the battery management modules 262 and 272 via the communication bus 286.

In another embodiment, in order to reduce the load of the communication bus 286, the battery management module 262 (272) can send a signal indicating the minimum cell voltage of the battery module 282 (284) to the CECU 280 through the communication bus 286. The micro-processor 266 can compare the cell voltages of the battery cells in the battery module 282 to obtain the minimum cell voltage of the battery module 282 according to a cell balancing algorithm. The cell balancing algorithm can be stored in the battery management module 262. Similarly, the battery management module 272 can compare the cell voltages of the battery cells in the battery module 284 to obtain a minimum cell voltage of the battery module 284. Accordingly, a signal indicating the minimum cell voltage of the battery module 284 is also sent to the CECU 280 through the communication bus 286. In addition, the communication bus 286 can isolate the CECU 280 from the battery modules 282 and 284 if an abnormal or undesirable condition occurs. The CECU 280 can compare the minimum cell voltages from the battery management modules 262 and 272 to generate the reference signal, which indicates the minimum voltage Vmin of the battery cell 202, 204, 206 and 208, in this instance.

The micro-processor 266 of the battery management modules 262 and the micro-processor 276 of the management module 272 can further compare the cell voltage of each battery cell with the minimum voltage Vmin for determining on which battery cell the balance operation is performed. The cell balancing algorithm employed by the micro-processor 266 or 276 can define a predetermined threshold $\Delta V$, in one embodiment. In another embodiment, the predetermined threshold $\Delta V$ can be configured by users. If the difference between the minimum voltage Vmin and the cell voltage of a battery cell is greater than the predetermined threshold $\Delta V$, the cell balancing will be performed on the corresponding battery cell, in one embodiment.

For example, if the battery cell 202 is determined to be balanced, the cell balancing driver 264 will activate the cell balancing circuit 222 to bypass a current of the battery cell 202. Similarly, the cell balancing circuit 224 can be activated by the cell balancing driver 264 for bypassing a current of the battery cell 204, the cell balancing circuits 226 and 228 can be activated by the cell balancing driver 274 for balancing the battery cells 206 and 208, respectively.

Advantageously, in one embodiment, the battery system 200 can be cell-balanced based on the common reference signal. More specifically, by comparing the cell voltages of different battery modules in the battery system 200, the CECU 280 can generate the reference voltage signal for the cell balance operation in each battery module. As such, cell balance among different battery modules can be achieved by using the common reference signal.

Figure 3:
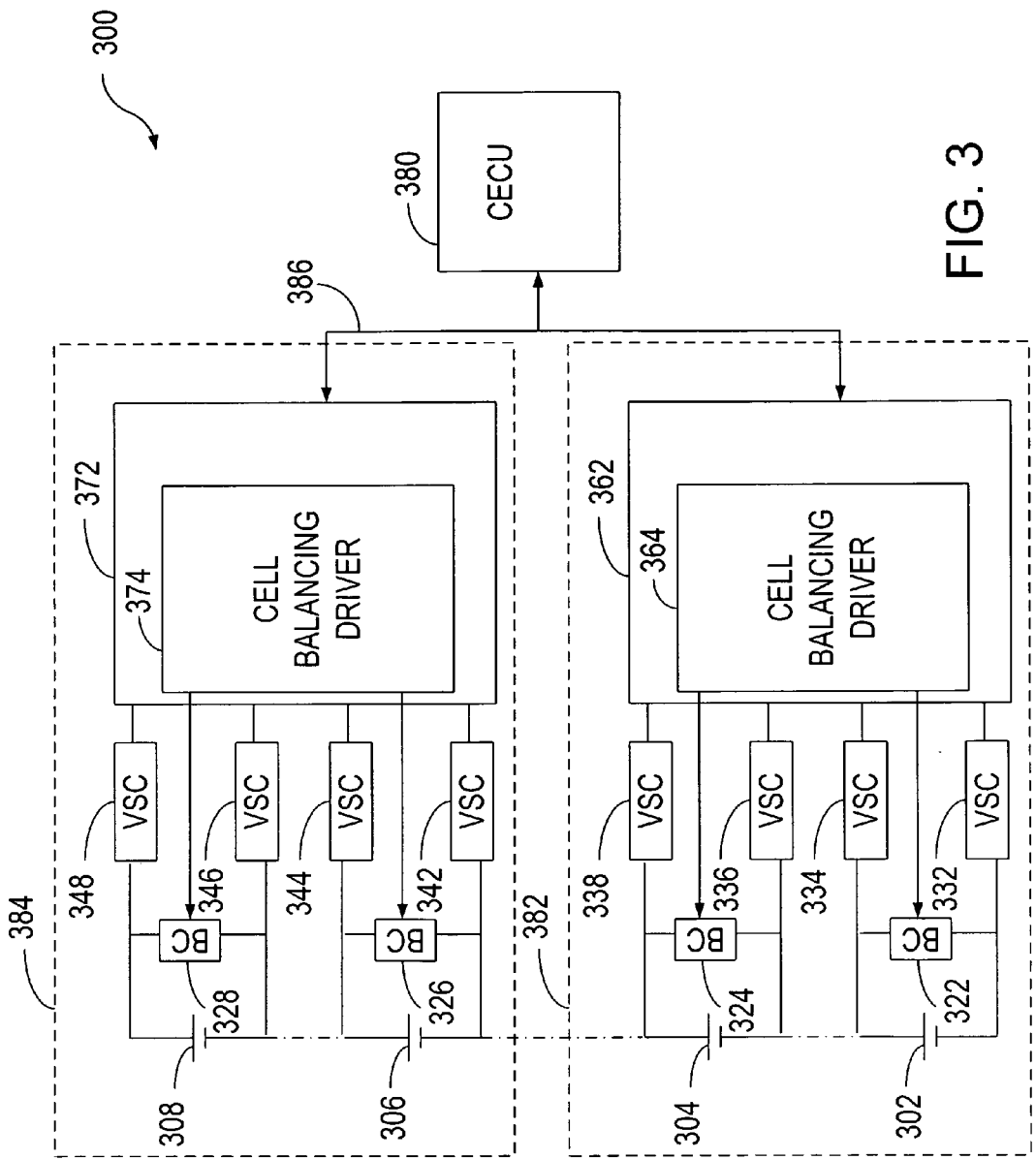
FIG. 3 is a diagram showing a system for balancing battery cells, in accordance with another embodiment of the present invention.

FIG. 3 illustrates a diagram showing a system 300 for balancing battery cells, in accordance with another embodiment of the present invention.

In one embodiment, the system 300 includes battery modules 382 and 384, and a central electric control unit (CECU) 380. In one embodiment, the battery module 382 includes battery cells 302 and 304, cell balancing circuits 322 and 324, cell voltage sampling circuits 332, 334, 336 and 338, and a battery management module 362. The battery module 384 includes battery cells 306 and 308, cell balancing circuits 326 and 328, and cell voltage sampling circuits 342, 344, 346 and 348, and a battery management module 372. The structure of the battery module 382 is similar to that of the battery module 384.

In one embodiment, the battery management module 362 is coupled to the battery cells 302 and 304 and includes a cell balancing driver 364. The battery management module 362 can be a protection and monitor IC for managing a battery pack. The battery management module 362 can monitor cell voltages of the battery cells 302 and 304 through the cell voltage sampling circuits 332, 334, 336 and 338. In one embodiment, besides measuring the voltages of the battery cells 302 and 304, the battery management module 362 can constantly monitor the charging/discharging current and the pack/cell temperature to provide various protection functions such as over-voltage, under-voltage, over-current, short circuit, over-temperature and under-temperature safety protection.

By monitoring the voltages of the battery cells 302 and 304, the battery management module 362 can send the information of the cell voltages to the CECU 380. Similarly, the battery management module 372 can send the information of the cell voltages of the battery cells 306 and 308 to the CECU 380. The CECU 380 is coupled to the battery management modules 362 and 372 through a communication bus 386. The communication bus 386 can transmit various signals such as voltage signals, and control signals. In addition, the communication bus 386 can isolate the CECU 380 from the battery modules 382 and 384 if an abnormal or undesirable condition occurs.

The CECU 380 which includes a cell balancing algorithm obtains the cell voltages of the battery cells 302, 304, 306, and 308 from the battery management modules 362 and 372. Using the cell balancing algorithm, the CECU 380 compares the voltage values of battery cells 302, 304, 306, and 308 to generate a reference signal. In one embodiment, the reference signal can indicate a minimum voltage Vmin of the battery cells in the battery modules 382 and 384. Furthermore, the CECU 380 can compare the minimum voltage Vmin with each cell voltage of the battery cells 302, 304, 306 and 308. If the difference between the minimum voltage Vmin and the cell voltage of a battery cell is greater than a predetermined threshold $\Delta V$, the cell balancing will be performed on the corresponding battery cell. The predetermined threshold $\Delta V$ can be defined by the cell balancing algorithm, in one embodiment. In another embodiment, the predetermined threshold ΔV can also be configured by users. For example, if the difference between the cell voltage of the battery cell 302 and the minimum voltage Vmin is greater than the predetermined threshold ΔV, the CECU 380 generates a control signal to the battery management module 362 through the communication bus 386. In response to the control signal from the CECU 380, the cell balancing driver 364 of the battery management module 362 can activate the cell balancing circuit 322 to bypass a current of the battery cell 302 so as to balance the battery cells.

Figure 4:
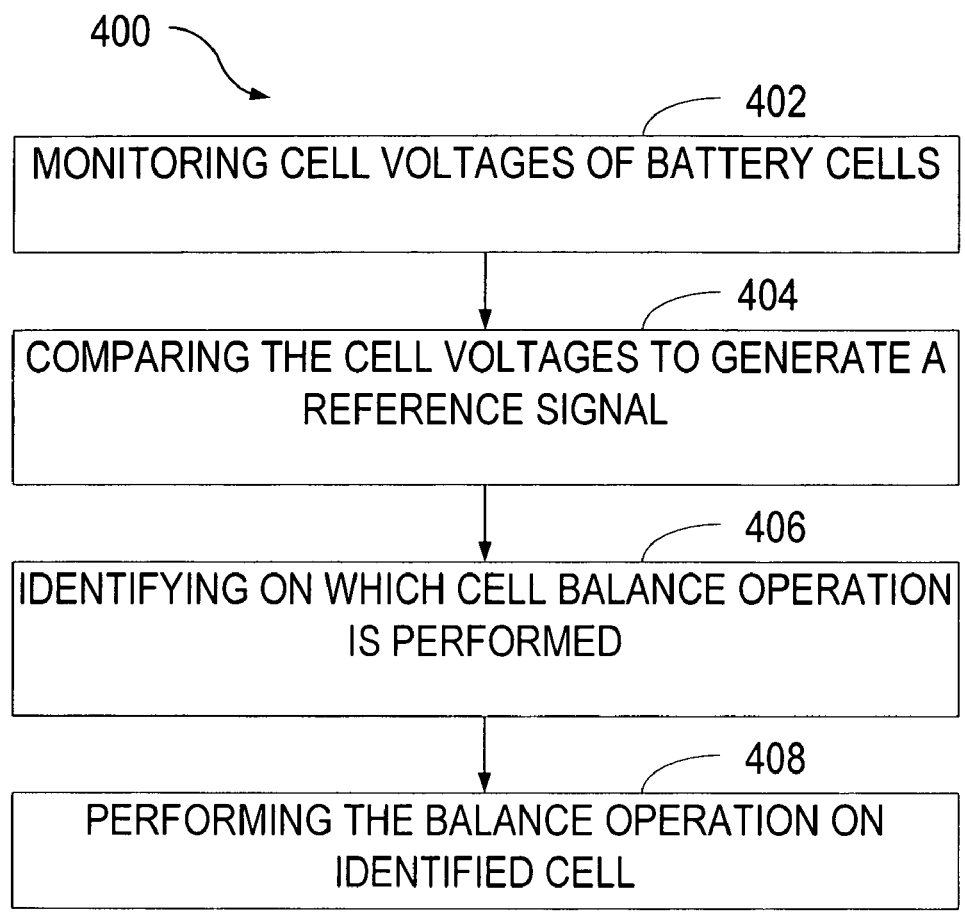
FIG. 4 is a flowchart showing a method for balancing cells, in accordance with one embodiment of the present invention.

FIG. 4 illustrates a flowchart showing a method for balancing cells, in accordance with one embodiment of the present invention. FIG. 4 is described in combination with FIG. 2.

At block 402, the cell voltages of the battery cells are monitored by the battery management modules. For example, the cell voltages of the battery cells 202, 204, 206 and 208 of the battery modules 282 and 284 are monitored. The cell voltage of the battery cell 202, for example, can be monitored by the battery management module 262 through the cell voltage sampling circuits 232 and 234. The battery management module 262 can periodically measure the cell voltages of the battery cells 202 and 204 at a predefined scan rate.

At block 404, the cell voltages from the battery modules can be compared to generate a reference signal. For example, the cell voltages of the battery cells 202, 204, 206 and 208 from the battery modules 282 and 284 are compared to generate the reference signal. In one embodiment, the reference signal can indicate a minimum cell voltage Vmin of the cell voltages of the battery cells 202, 204, 206 and 208.

At block 406, based on the reference signal, cell(s) on which the cell balance operation needs to be performed can be identified. For example, each of the cell voltages of the battery cells 202, 204, 206 and 208 can be compared with the reference signal according to a cell balancing algorithm. The cell balancing algorithm can define a predetermined threshold ΔV. If the difference between the minimum voltage Vmin and the battery cell voltage of a cell is greater than the predetermined threshold ΔV, the cell balancing will be performed on the corresponding battery cell.

At block 408, the balance operation can be performed on the identified cell in each of the battery modules. For example, the cell balancing driver 264 or 274 can activate the corresponding cell balancing circuit, e.g., the cell balancing circuit 222, 224, 226 or 228 for performing the balance operation. If the battery cell 202, for example, is identified to be balanced, the cell balancing driver 264 of the battery management module 262 can activate the cell balancing circuit 222 to bypass a current of the battery cell 202 so as to balance the battery cells.

While the foregoing description and drawings represent the embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention not limited to the foregoing description.

What is claimed is:

1. A cell balancing system, comprising:
    a plurality of battery modules, said battery modules each comprising:
        a plurality of battery cells;
        a battery management module coupled to said battery cells and configured to acquire cell voltages of said battery cells in each of said battery modules, and to compare said cell voltages to obtain a minimum cell voltage among said cell voltages in each of said battery modules; and
        a plurality of balance circuits coupled to said battery cells and configured to perform a balance operation on said battery cells under control of said battery management module; and
    a controller coupled to said battery modules and configured to receive a plurality of voltage signals from said battery modules, respectively, wherein each of said voltage signals indicates a minimum cell voltage associated with a corresponding battery module, wherein said controller compares said voltage signals to generate a reference signal indicating an overall minimum voltage among cell voltages of said battery cells in all said battery modules, wherein said cell balancing system compares each of said cell voltages to said reference signal, and wherein said battery management module in each of said battery modules controls said balance circuits according to a result of said comparison to balance said battery cells, thereby achieving cell balance among said battery modules.

2. The system as claimed in claim 1, wherein each of said battery modules further comprises a plurality of voltage sampling circuits coupled between said battery cells and said battery management module and configured to monitor said cell voltages.

3. The system as claimed in claim 1, wherein said battery management module in one of said battery modules further comprises a processor configured to compare said cell voltages in a corresponding battery module of said battery modules to generate said minimum cell voltage associated with said corresponding battery module.

4. The system as claimed in claim 1 wherein said controller generates as balance control signal according to said comparison between each of said cell voltages and said reference signal and provides said balance control signal to said battery modules.

5. The system as claimed in claim 4, wherein said balance control signal determines on which well said balance operation is performed.

6. The system as claimed in claim 1, wherein said battery modules receive said reference signal and determine on which cell said balance operation is performed according to said comparison between each of said cell voltages and said reference signal.

7. The system as claimed in claim 1, wherein said balance operation is performed on one cell of said cells if a difference between a corresponding cell voltage of said cell and said reference signal is greater than a predetermined threshold.

8. A method for balancing a plurality of battery modules, said method comprising:
    monitoring cell voltages of a plurality of battery cells in each of said battery modules;
    comparing said cell voltages to obtain a minimum cell voltage among said cell voltages in each of said battery modules;
    receiving a plurality of voltage signals from said battery modules, respectively, wherein each of said voltage signals indicates a minimum cell voltage associated with a corresponding battery module;

comparing said voltage signals to generate a reference signal indicating an overall minimum voltage among cell voltages in all said battery modules;

comparing each of said cell voltages to said reference signal;

identifying on which cell a balance operation is performed in each of said battery modules based on said comparison between each of said cell voltages and said reference signal; and performing said balance operation on the identified cell in each of said battery modules, thereby achieving cell balance among said battery modules based on said reference signal.

9. The method as claimed in claim 8, wherein said identifying comprises;

identifying a cell if a voltage difference between a corresponding cell voltage of said cell and the voltage of said reference signal is greater than a predetermined threshold.

10. The method as cured in claim 8, wherein the step of performing said balance operation comprises:

activating a plurality of cell balancing circuits based on said reference signal; and bypassing a current of said identified cell by said cell balancing circuits.

11. A cell balancing system for balancing plurality battery modules, said circuit comprising:

a plurality of battery management modules corresponding to said plurality of battery modules, respectively, wherein each of said battery management modules is configured to monitor cell voltages of a plurality of battery cells in a corresponding battery module and to compare said cell voltages to obtain a minimum cell voltage among said cell voltages in each of said battery modules;

a plurality of balance circuits coupled to said battery cells and configured to perform balance operation on said battery cells under control of said battery management modules respectively; and a controller coupled to said battery modules and configured to receive a plurality of voltage signals from said battery modules, respectively, wherein each of said voltage signals indicates a minimum cell voltage associated with a corresponding battery module, wherein said controller compares said voltage signals to provide a reference signal indicating an overall minimum voltage among cell voltages in all said battery modules, wherein said cell balancing system compares each of said cell voltages to said reference signal, and wherein said battery management modules control said balance circuits respectively according to a result of said comparison to balance said battery cells according to said reference signal, thereby achieving cell balance among said battery modules.

12. The system as claimed in claim 11, wherein said controller generates a balance control signal based on said comparison between each of said cell voltages and said reference signal and provides said balance control signal to said battery modules.

13. The system as claimed in claim 12, wherein said balance con signal determines on which cell said balance operation is performed.

14. The system as claimed in claim 11, wherein said battery modules receive said reference signal and determine on which cell said balance operation is performed based on said comparison between each of said cell voltages and said reference signal.

* * * * *